United States Patent [19]
Okuyama et al.

[11] Patent Number: 5,540,082
[45] Date of Patent: Jul. 30, 1996

[54] POSITIONING DETECTOR

[75] Inventors: Tomoyuki Okuyama; Takashi Takebayashi, both of Ibaraki-ken, Japan

[73] Assignee: SMC Kabushiki Kaisha, Tokyo, Japan

[21] Appl. No.: 427,627

[22] Filed: Apr. 21, 1995

Related U.S. Application Data

[63] Continuation of Ser. No. 172,813, Dec. 27, 1993, abandoned.

[30] Foreign Application Priority Data

Dec. 28, 1992  [JP]  Japan ..................... 4-348628

[51] Int. Cl.⁶ ............................... G01B 13/12
[52] U.S. Cl. ..................... 73/37.5; 340/815.45
[58] Field of Search ............ 73/37, 37.5; 340/686, 340/815.45

[56] References Cited

U.S. PATENT DOCUMENTS

| | | | |
|---|---|---|---|
| 2,266,566 | 12/1941 | Poole | 73/37.5 |
| 2,589,251 | 3/1952 | Heinz | 73/37.5 |
| 2,691,827 | 10/1954 | Aller | 73/37.5 |
| 2,707,389 | 5/1955 | Fortier | 73/37.5 |
| 3,477,276 | 11/1969 | Fortier | 73/37.5 |
| 3,962,903 | 6/1976 | Firdaus | 73/37.5 |
| 4,550,592 | 11/1985 | Dechape | 73/37.5 |
| 4,594,881 | 6/1986 | Imamura | 73/37.5 |
| 4,965,548 | 10/1990 | Fayfield | 340/511 |
| 5,039,978 | 8/1991 | Kronberg | 340/815.45 |

FOREIGN PATENT DOCUMENTS 2556780  6/1976  Germany .

*Primary Examiner*—Michael J. Brock
*Attorney, Agent, or Firm*—Oblon, Spivak, McClelland, Maier & Neustadt, P.C.

[57] ABSTRACT

A positioning detector detects whether a workpiece has been positioned on a reference surface even when the pressure of a fluid supplied from a fluid pressure source and applied to the workpiece varies. A fluid is jetted from a nozzle toward a surface of the workpiece, and a back pressure of the fluid developed behind the nozzle is detected. A fluid pressure bridge is composed of the nozzle, a variable restriction, and a pair of fixed restrictions, and is connected to a semiconductor pressure sensor for detecting the difference between the back pressure and the pressure of a fluid vented through the variable restriction. The semiconductor pressure sensor has output terminals connected to a plurality of comparators for comparing the pressure difference detected by the semiconductor pressure sensor with respective different thresholds. Depending on the detected pressure difference, the comparators produce a different combination of output signals to selectively energize a plurality of light-emitting diodes for allowing the user to visually confirm the positioning of the workpiece with respect to the reference surface.

10 Claims, 8 Drawing Sheets

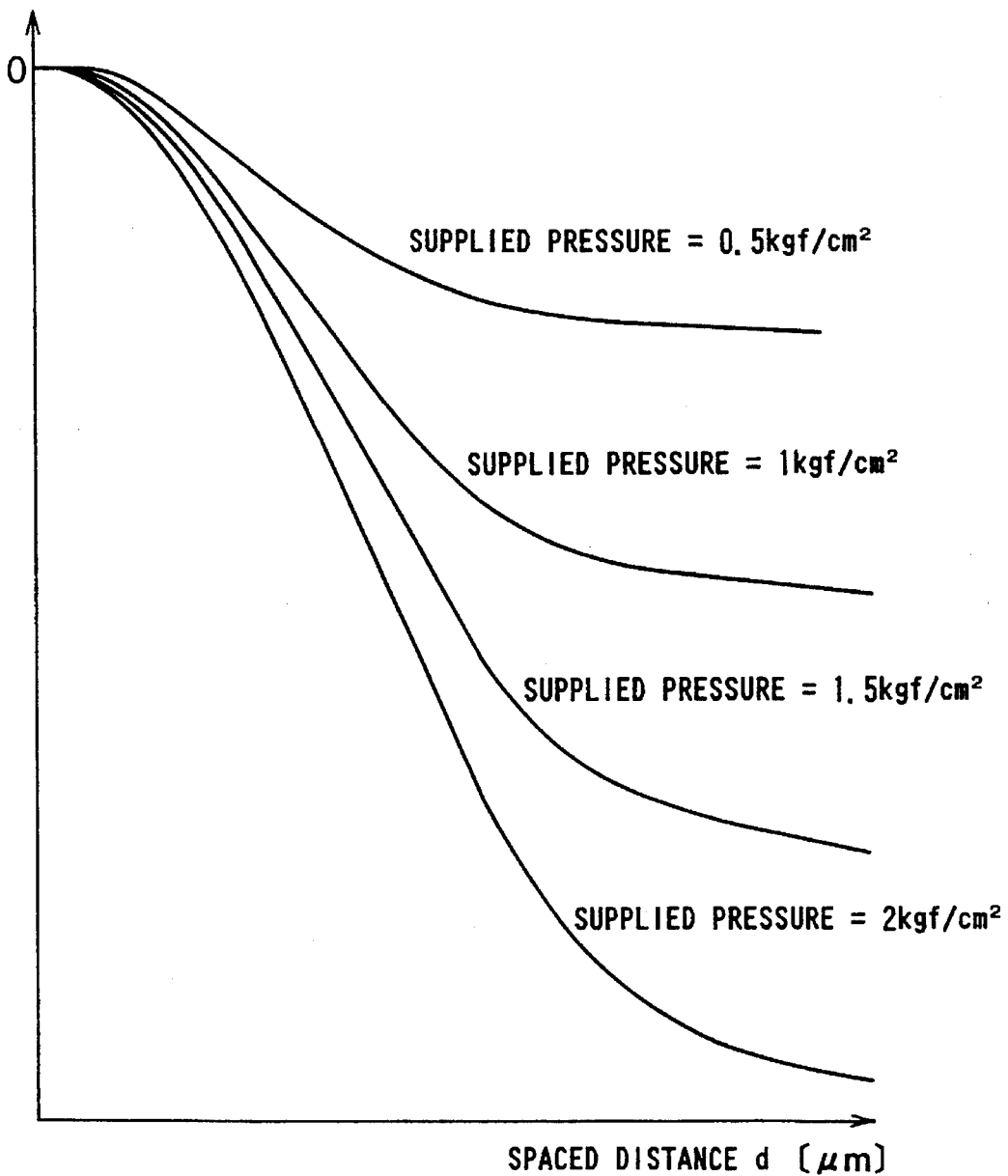

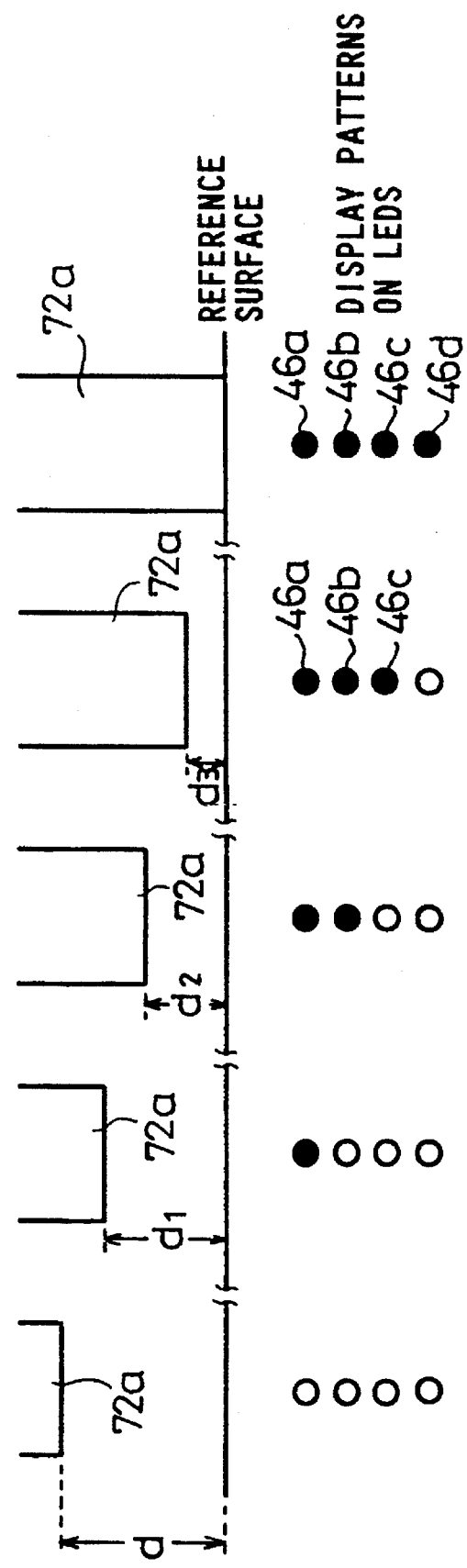

5,540,082

POSITIONING DETECTOR

This application is a continuation of application Ser. No. 08/172,813, filed on Dec. 27, 1993, now abandoned.

BACKGROUND OF THE INVENTION

1. Field of the Invention

The present invention relates to a positioning detector for detecting whether a workpiece has been positioned on a reference surface and indicating the detected condition on a indicating unit to allow the user to visually confirm the detected condition.

2. Description of the Related Art

For positioning a workpiece on a reference surface in a machine tool such as a cutting machine, it has been a customary practice to jet a fluid under pressure from a nozzle toward a surface of the workpiece, detect a back pressure developed behind the nozzle by the application of the fluid to the workpiece surface, and determine distance by which the workpiece is spaced from the reference surface based on the generated back pressure.

The basic principles of the detection of the back pressure are illustrated in FIG. 1 of the accompanying drawings. A pressure fluid supplied from an unillustrated pressure source whose pressure is regulated by a variable restriction 2 is introduced into a nozzle 4. The fluid is then jetted from the nozzle 4 toward a surface of a workpiece 6. A back pressure due to the jet of the fluid, developed behind the nozzle 4 is detected by a sensor S disposed on a line which connects the nozzle 4 and the variable restriction 2.

The back pressure detected by the sensor S and the distance d by which the workpiece 6 is spaced from the head of the nozzle 4 is related to each other as shown in FIG. 2 of the accompanying drawings. Therefore, it is possible to detect whether the workpiece 6 has been positioned on the reference surface by detecting, with the sensor S, the back pressure generated by the jet of the fluid from the nozzle 4 to the workpiece 6.

In the event that the fluid pressure of the pressure fluid source varies, however, the characteristics shown in FIG. 2 also vary, and it becomes impossible to detect accurately whether the workpiece 6 has been positioned on the reference surface.

SUMMARY OF THE INVENTION

It is therefore an object of the present invention to provide a positioning detector which can reliably detect whether a workpiece has been positioned on a reference surface by measuring a back pressure of a nozzle even when a source pressure of a pressure fluid source applied to the nozzle varies.

Another object of the present invention is to provide a positioning detector which can produce a visual indication to allow the user to easily determine whether a workpiece has been positioned on a reference surface even when the source pressure of a pressure fluid source applied to the nozzle varies.

Still another object of the present invention is to provide a positioning detector which can generate a warning when a workpiece is positioned off a reference surface on which the positioning detector is placed.

Yet still another object of the present invention is to provide a positioning sensor of a simple arrangement which is capable of reliably detecting positioning of a workpiece with respect to a reference surface.

According to the present invention, the above objects can be achieved by a positioning detector for detecting whether a workpiece is positioned on a reference surface, by detecting a back pressure of a nozzle from which a pressurized fluid is jetted toward the surface of said workpiece, comprising a positioning table having the reference surface and the nozzle with the tip thereof disposed on and perpendicular to the reference surface, a first fluid passage communicating with the nozzle through a tube, a second fluid passage communicating with the atmospheric pressure via a variable restriction, a pair of fixed restrictions for respectively supplying the pressurized fluid to the first and second fluid passages, a bridge circuit having a pressure sensor for detecting a differential pressure between the pressures in the first and second fluid passages, a threshold generating circuit for generating a plurality of different threshold values, comparing means for comparing the differential pressure with respective different threshold values, and indicating means for indicating respective results of comparison by the comparing means.

The positioning detector may include a first casing having a fluid port connected with a fluid pressure source for receiving therefrom the pressurized fluid into the positioning detector, and a second casing coupled to the first casing, wherein the fixed restrictions, the variable restriction, and the pressure sensor are housed. The nozzle may be defined in the first casing, and the second casing includes respective parts of the first and second fluid passages, which communicate with respective pressure-detecting surfaces of the pressure sensor.

The indicating means may comprise a plurality of light-emitting elements for indicating whether the workpiece has reached a desired position on the reference surface. The light-emitting elements may be mounted in a linear array on an outer surface of the second casing. Preferably, the number of said light-emitting elements may be at least three.

The comparing means may respectively comprise as many comparators as the number of light-emitting elements. The comparators may be given respectively the threshold values as respective reference signals to be compared with the differential pressure, and the indicating means are connected respectively to output terminals of the comparators. Depending on the position of the workpiece with respect to the reference surface, the comparators produce a different combination of output signals which are supplied to selectively turn on the light-emitting elements.

The positioning detector may further comprise notifying means for generating a notification signal when the workpiece reaches within a predetermined allowable range from the reference surface.

Preferably, the pressure sensor may comprise a semiconductor pressure sensor.

BRIEF DESCRIPTION OF THE DRAWINGS

The above and other objects, features, and advantages of the present invention will become apparent from the following description when taken in conjunction with the accompanying drawings which illustrate a preferred embodiment of the present invention by way of example.

FIG. 7 is a diagram showing the relationship between the output signal of a semiconductor pressure sensor and the distance by which a workpiece is spaced from a reference surface; and FIGS. 8A through 8E are diagrams illustrating the patterns in which LEDs emit light in the process of seating the workpiece on the reference surface.

DETAILED DESCRIPTION OF THE PREFERRED EMBODIMENT

Figure 1:
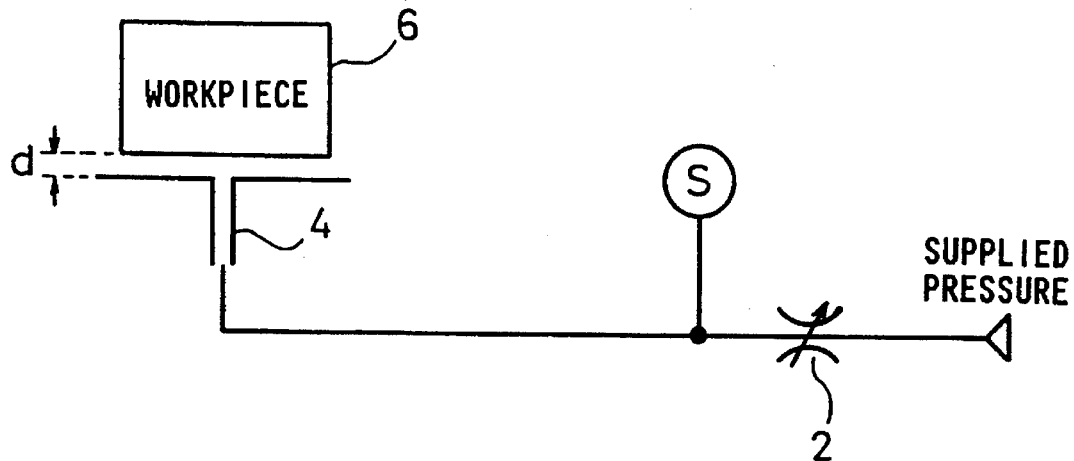
FIG. 1 is a schematic diagram illustrative of the basic principles of the detection of a back pressure.
Figure 2:
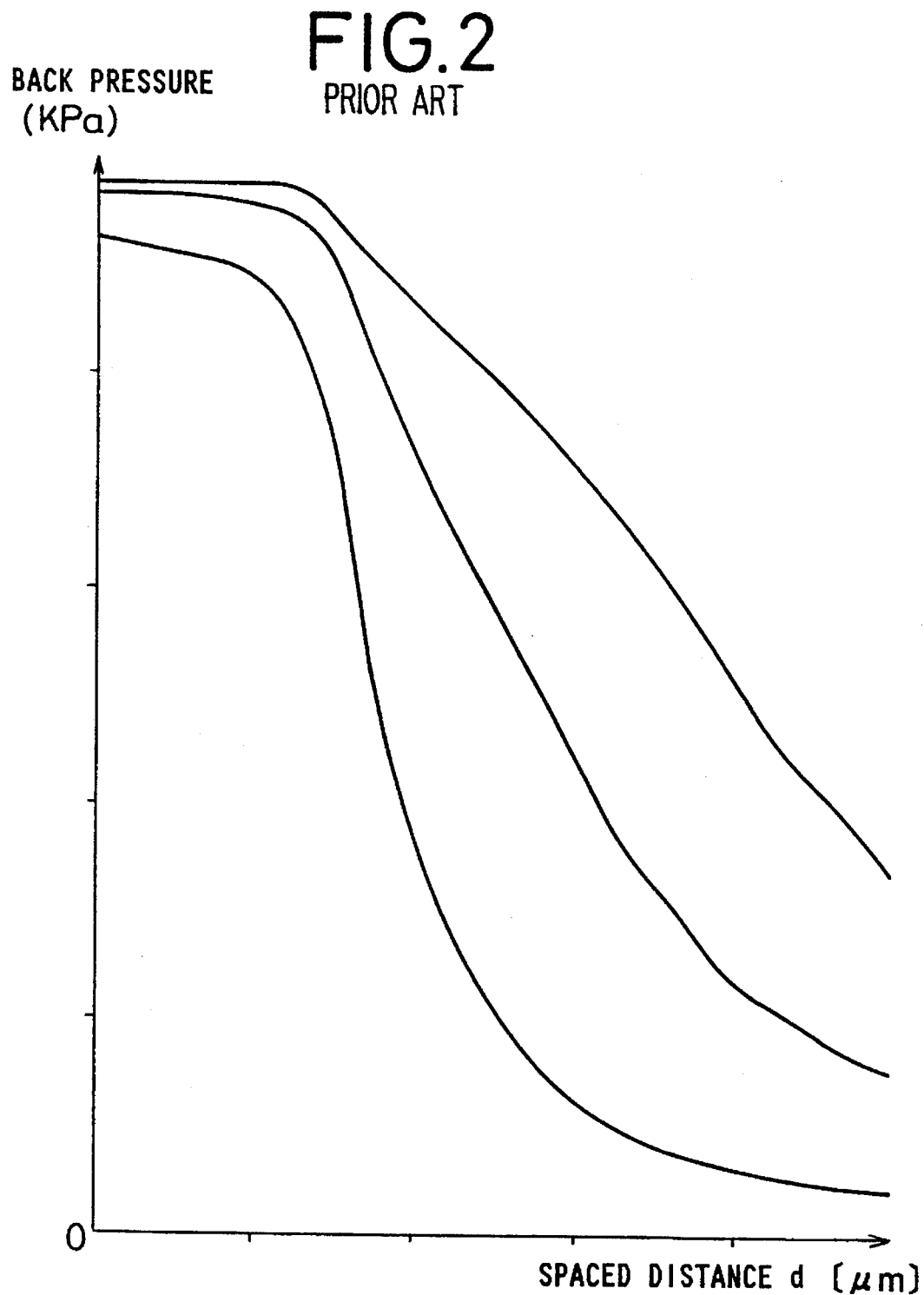
FIG. 2 is a diagram showing the relationship between back pressures and distances by which a workpiece is spaced from a reference surface.
Figure 3:
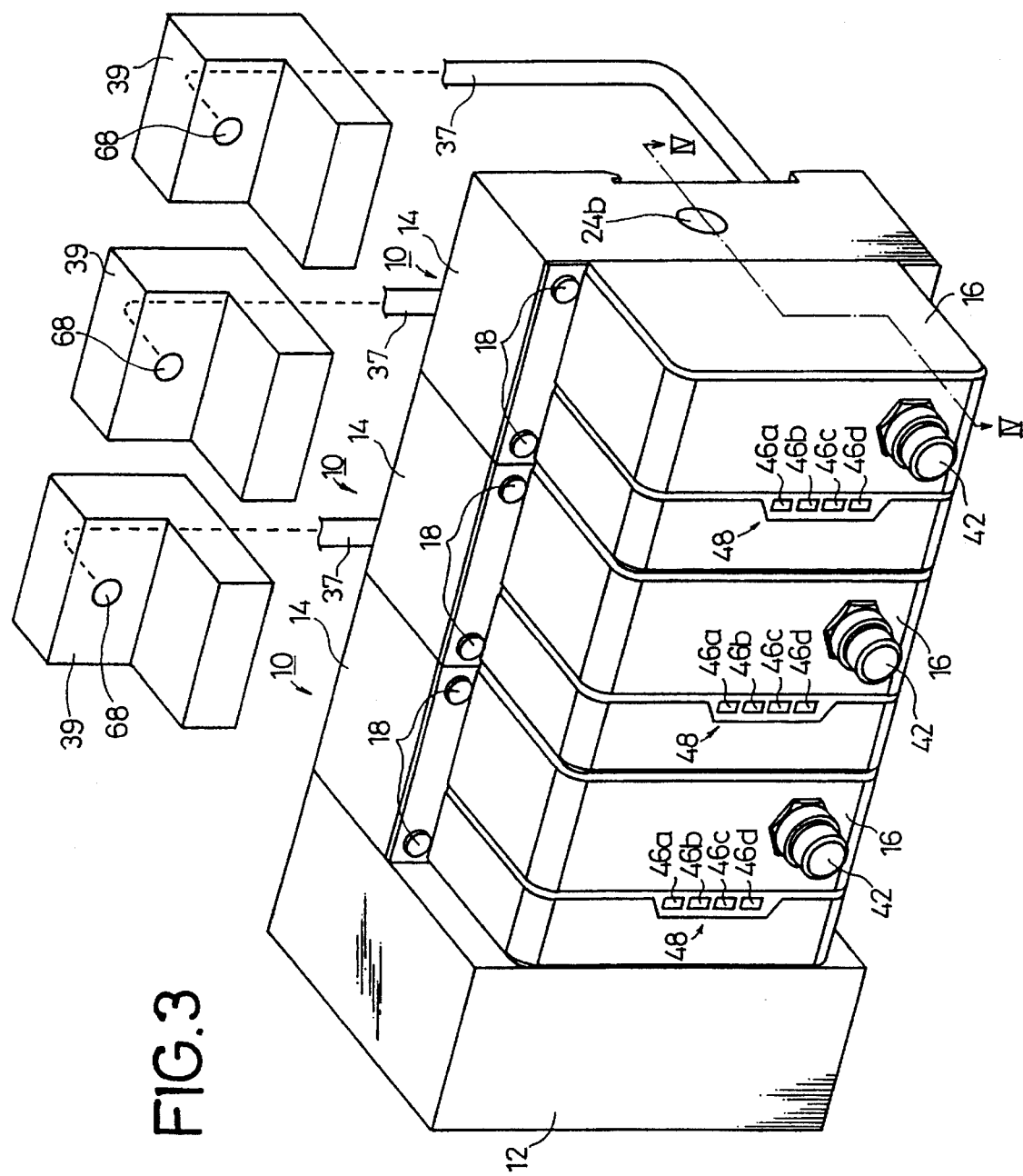
FIG. 3 is a perspective view of a system which comprises a plurality of positioning detectors according to the present invention.

As shown in FIG. 3, three positioning detectors 10 according to the present invention are juxtaposed and joined together, and a terminal box 12 is coupled to one end of the assembly of the positioning detectors 10.

Figure 4:
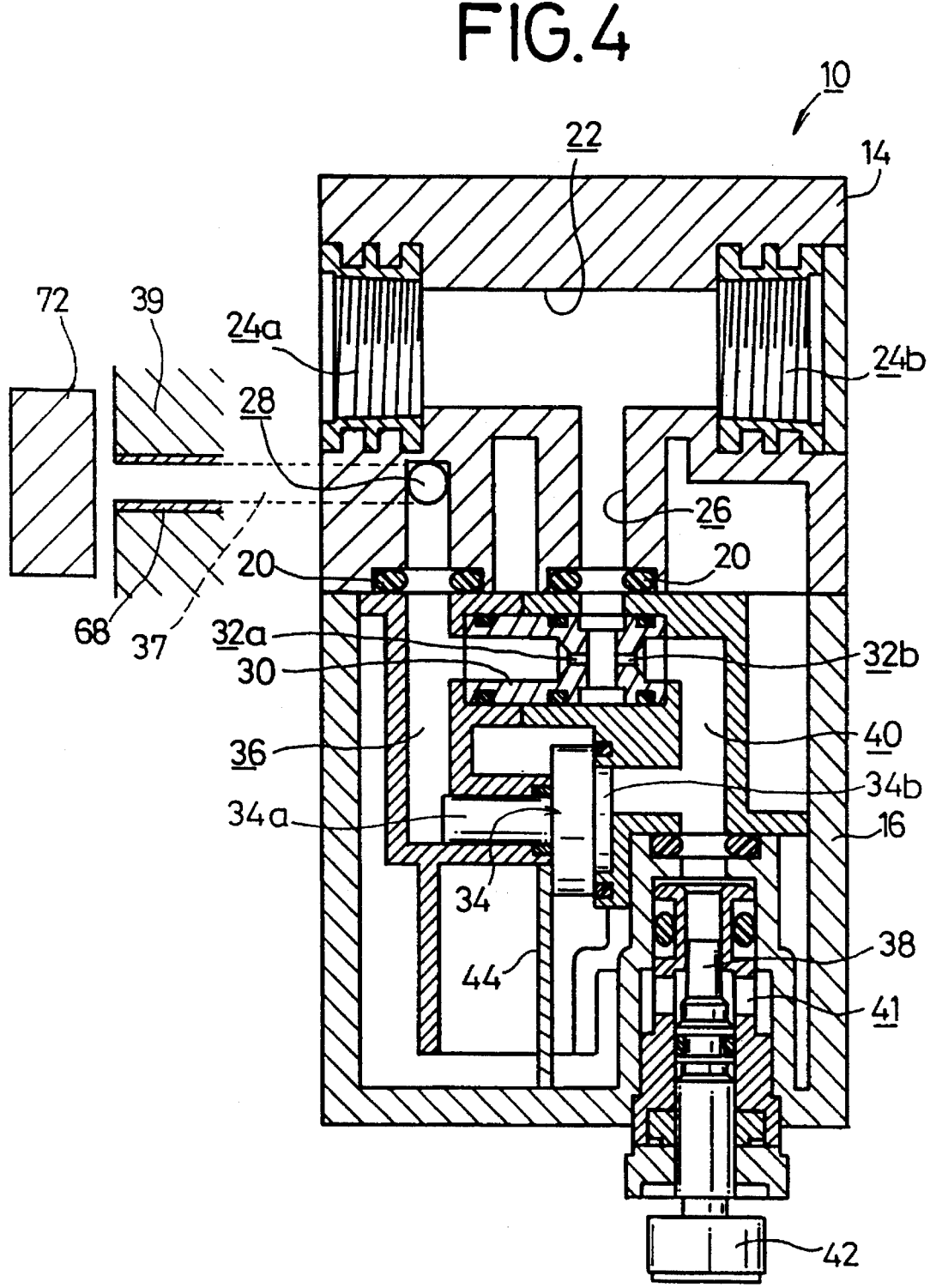
FIG. 4 is a cross-sectional view taken along line IV—IV of FIG. 3.

As shown in FIGS. 3 and 4, each of the positioning detectors 10 comprises a first casing 14 and a second casing 16 that are fastened to each other by screws 18. Seal members 20 (see FIG. 4) are interposed between mating surfaces of the first and second casings 14, 16 to keep the first and second casings 14, 16 hermetically sealed.

The first casing 14 has fluid inlet/outlet ports 24a, 24b defined in opposite walls thereof and communicating with each other through a passage 22 defined therebetween. A passage 26 is branched perpendicularly from the passage 22. The first casing 14 also has a passage 28 defined closely to the fluid inlet/outlet port 24a and communicating with a port defined in a bottom surface of the first casing 14. The passage 28 communicates with a nozzle 68 which serves to generate a back pressure as described later on.

The second casing 16 has a fixed restriction 30 for controlling the rate of a fluid, such as air, that is introduced under pressure from the passage 26 into the second casing 16. The fixed restriction 30 comprises a pair of small opposite bleeding holes 32a, 32b communicating with the passage 26. Therefore, the fluid introduced from the passage 26 is divided to flow into the bleeding holes 32a, 32b. The bleeding hole 32a communicates with a passage 36 defined in the second casing 16 and communicating with the passage 28 in the first casing 14. The passage 28 communicates with the nozzle 68 through a flexible tube 37. The bleeding hole 32b communicates with a passage 40 defined in the second casing 16 and is connected to a variable restriction 38. The fluid from the bleeding hole 32b is controlled in rate by the variable restriction 38, and is discharged out of the second casing 16 through a passage 41 that communicates with a discharge port (not shown) defined in a bottom surface of the second casing 16. The variable restriction 38 has an adjusting knob 42 projecting out of the second casing 16.

As shown in FIG. 4, a positioning table 39 having a reference surface on which a workpiece is to be seated and the nozzle 68 are connected to the passage 28 in the first casing 14 through the flexible tube 37. In the positioning table 39, the tip of the nozzle 68 opens on and is perpendicular to the reference surface.

Figure 5:
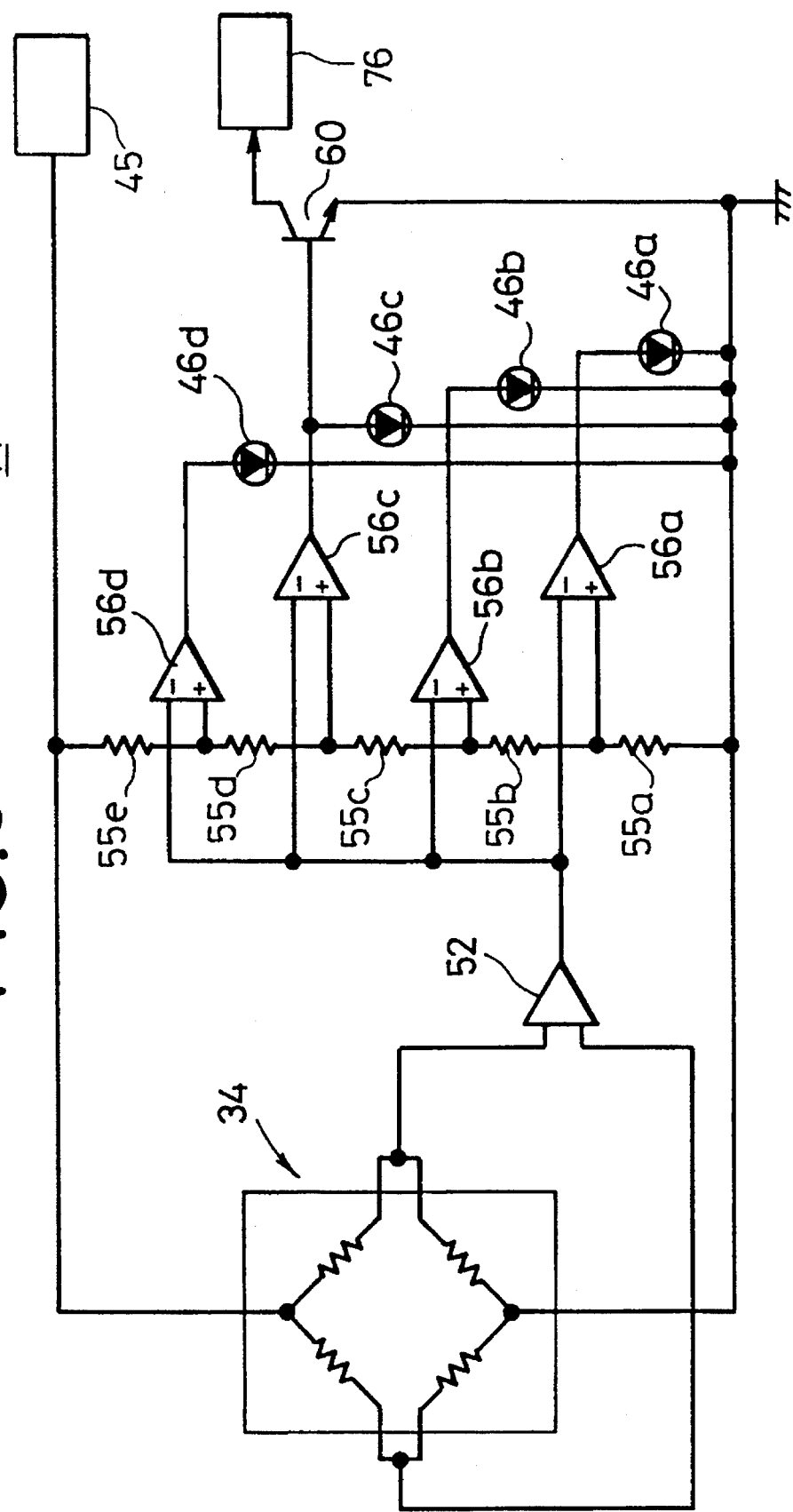
FIG. 5 is a block diagram of a circuit on a circuit board in each of the positioning detectors shown in FIG. 3.

The second casing 16 houses a one-chip semiconductor pressure sensor 34 which has an electrical bridge circuit for detecting the pressure difference between the passages 36, 40 in the second casing 16, a pressure-detecting end surface 34a facing to the passage 36 and an opposite pressure-detecting end surface 34b facing to the passage 40. A circuit board 44 having a circuit shown in FIG. 5 is disposed in the second casing 16 closely to the pressure sensor 34. As shown in FIG. 3, a light-emitting assembly 48 composed of a linear array of four light-emitting diodes (LEDs) 46a–46d is disposed on an outer wall surface of the second casing 16 near the adjusting knob 42 of the variable restriction 38. The LEDs 46a–46d are selectively energized by an electric signal which is generated by the semiconductor pressure sensor 34 and processed by the circuit board 44. The semiconductor pressure sensor 34 may be a pressure-electricity transducer comprising a piezoelectric semiconductor or a PN junction device.

As shown in FIG. 5, the circuit on the circuit board 44 is electrically connected to the semiconductor pressure sensor 34 which is connected to a fixed-voltage power source 45 and comprises the electrical bridge circuit of the semiconductor pressure sensor 34. The circuit on the circuit board 44 comprises a differential amplifier 52 connected to the output terminals of the semiconductor pressure sensor 34, for amplifying a differential pressure signal developed by the semiconductor pressure sensor 34, and a plurality of comparators 56a–56d connected to the output terminals of the differential amplifier 52 and serving as a multilevel comparator for comparing a differential pressure signal outputted from the differential amplifier 52 with different thresholds. The LEDs 46a–46d are connected respectively to the output terminals of the comparators 56a–56d. In response to output signals from the comparators 56a–56d, the LEDs 46a–46d are selectively energized to emit light.

A voltage supplied from the fixed-voltage power source 45 is divided by series-connected resistors 55a–55d, and voltages developed across the respective resistors 55a–55d are applied as thresholds to the comparators 56a–56d. The comparators 56a–56d compare the differential pressure signal from the differential amplifier 52 with the respective thresholds, and apply output signals to the LEDs 46a–46d, respectively, which then selectively emit light depending on the supplied output signals from the comparators 56a–56d. The comparator 46c has an output terminal connected to the base of an open-collector transistor 60. When the output signal from the comparator 46c is applied to the base of the open-collector transistor 60, the open-collector transistor 60 is turned on, to energize a notification means 76 for notifying that a workpiece has been seated on a reference surface (described below) of the positioning device 10.

As shown in FIG. 3, the fluid inlet/outlet ports 24a, 24b of the juxtaposed positioning detectors 10 are hermetically coupled in a manifold configuration. The terminal box 12 houses terminals (not shown) that are electrically connected to the circuit boards 44 in the respective positioning detectors 10.

Operation of the positioning detector 10 shown in FIG. 4, as it is used singly, will be described below.

The fluid inlet/outlet port 24a is connected to a fluid pressure source 74 such as a pneumatic pressure source, and the other fluid inlet/outlet port 24b is closed by a blind plug (not shown) or the like. A fluid is introduced under pressure from the fluid pressure source 74 into the passage 22, and then flows through the passage 26 into the fixed restriction 30. The fluid is then divided by the bleeding holes 32a, 32b into the respective passages 36, 40. The flow rate of the fluid introduced under pressure into the passage 40 is controlled by the variable restriction 38, and is then discharged out of the second casing 16 through the passage 41 and the discharge port defined in the bottom surface of the second casing 16.

The fluid supplied under pressure into the passages 36, 28 and the flexible tube 37, flows into the nozzle 68 fixed on the positioning table 39 and develops a back pressure. The semiconductor pressure sensor 34 detects the differential pressure between the fluid that has been introduced through the bleeding hole 34a into the passage 36 that is the back pressure of the nozzle 68, and the fluid that has been introduced through the bleeding hole 34b into the passage 40, and outputs an electric signal indicative of the detected differential pressure to the differential amplifier 52 on the circuit board 44.

Figure 6:
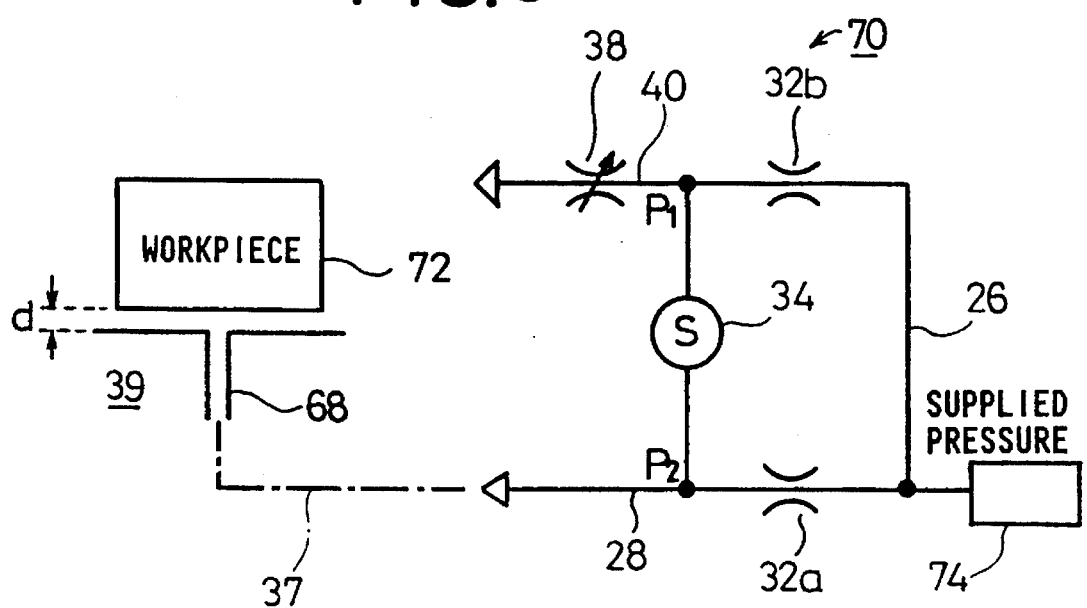
FIG. 6 is a schematic diagram showing the basic principles of a fluid pressure bridge circuit.

The variable restriction 38, the bleeding holes 32a, 32b, the nozzle 68, and the semiconductor pressure sensor 34 jointly serve as a fluid pressure bridge 70 shown in FIG. 6.

As shown in FIG. 6, the fluid pressure bridge 70 is connected to a fluid pressure source 74, and includes the bleeding holes 32a, 32b that lie parallel to each other and are connected through the passage 26 to the fluid pressure source 74. The variable restriction 38 is connected in series with the bleeding hole 32b through the passage 40, and has an output end vented to the atmosphere. The nozzle 68 is connected through the passages 28, 36 and a flexible tube 37 to the other bleeding hole 32a. The semiconductor pressure sensor 34 is connected between the bleeding holes 32a, 32b for detecting the difference ($P_1$–$P_2$) between the pressure $P_2$ of the fluid pressure flowing in the passage 36 and the pressure $P_1$ of the fluid flowing in the passage 40. Therefore, the semiconductor pressure sensor 34 does not directly detect the fluid pressure of the fluid pressure source 74, but detects the differential difference ($P_1$–$P_2$). Consequently, even when the fluid pressure of the fluid pressure source 74 varies as shown in FIG. 7, the distance d between the workpiece 72 and the reference surface is regarded as being constant if the differential pressure detected by the semiconductor pressure sensor 34 is zero (0).

The positioning detector 10 is used as follows: The workpiece 72 is seated on the reference surface of the positioning detector 10 under optimum conditions, and while the workpiece 72 is being seated on the reference surface under optimum conditions, the variable restriction 38 is adjusted to set the differential pressure ($P_1$–$P_2$) as detected by the semiconductor pressure sensor 34 to zero (0), i.e., to eliminate the difference between the back pressure developed behind the nozzle 68 when the fluid is ejected from the nozzle 68 and the fluid pressure ejected from the variable restriction 38. Thereafter, another workpiece 72a which is identical to the workpiece 72 is positioned on the reference surface. The fluid under pressure, preferably air under pressure, is supplied from the fluid pressure source 74. The differential pressure between the fluid flowing in the passage 36 and the fluid flowing in the passage 40 is detected by the semiconductor pressure sensor 34, which applies a detected signal to the differential amplifier 52 on the circuit board 44. The differential amplifier 52 amplifies and outputs the differential pressure signal from the semiconductor pressure sensor 34.

When the distance d between the reference surface on the positioning table 39 and the surface of the workpiece 72a which faces the reference surface is large, as shown in FIG. 8A, the back pressure of the fluid behind the nozzle 68 is relatively low, and the differential pressure between the back pressure and the fluid pressure vented through the variable restriction 38 becomes relatively high. At this time, the LEDs 46a–46d are not energized and do not emit light. More specifically, the differential pressure detected by the semiconductor pressure sensor 34 and the output voltage of the semiconductor pressure sensor 34 are inversely proportional to each other. Therefore, if the differential pressure detected by the semiconductor pressure sensor 34 is higher, then the output voltage of the semiconductor pressure sensor 34 is lower. Since the distance d between the reference surface and the surface of the workpiece 72a is relatively large as shown in FIG. 8A, the differential pressure detected by the semiconductor pressure sensor 34 is relatively large, and the output voltage of the semiconductor pressure sensor 34 is relatively low, i.e., lower than the threshold voltages applied to the respective comparators 56a–56d. As a result, the comparators 56a–56d do not produce output signals, and the LEDs 46a–46d are not turned on. No emission of light from all the LEDs 46a–46d indicates that the workpiece 72a has not reached a predetermined position on the reference surface. When the workpiece 72a moves through the positions $d_1$ and $d_2$ shown in FIGS. 8B and 8C to the position $d_3$ shown in FIG. 8D, the back pressure of the fluid behind the nozzle 68 is increased, reducing the difference between the back pressure and the fluid pressure vented from the variable restriction 38. The differential pressure detected by the semiconductor pressure sensor 34 becomes much smaller than it was when the workpiece 72a was in the position shown in FIG. 8A, and the output voltage of the semiconductor pressure sensor 34 becomes much higher, i.e., high enough to cause the comparators 56a–56c to produce output signals. In response to the output signals from the comparators 56a–56c, the LEDs 46a–46c connected respectively thereto are energized and emit light. In this manner, as the distance d becomes smaller, i.e., as the workpiece 72a approaches the reference surface, the number of LEDs which emit light is increased. Thus, FIG. 8D shows that the distance $d_3$ has reached within a predetermined allowable positioning range from the reference surface and the three LEDs 46a–46c emit light. FIG. 8E shows that the workpiece 72a is seated on the reference surface under optimum conditions and all the four LEDs 46a–46d emit light. At this time, the back pressure of the fluid behind the nozzle 68 is maximum, and the differential between the back pressure and the fluid pressure ejected from the variable restriction 38 is the smallest (zero (0)).

As shown in FIGS. 8A to 8E, the distance between the reference surface and the surface of the workpiece 72 which faces the reference surface is displayed stepwise by successive combinations of the LEDs 46a–46d. The combinations of the LEDs 46a–46d shown in FIGS. 8D and 8E allow the user to visually recognize that the distance d has reached within a predetermined allowable positioning range from the reference surface and that the workpiece has been seated on the reference surface.

The displayed patterns on the LEDs 46a–46d may be used to assist the user in adjusting the variable restriction 38 in order to set the differential pressure as detected by the semiconductor pressure sensor 34 to zero. Specifically, from the condition in which all of the four LEDs 46a–46d are emitting light, the user may turn the adjusting knob 42 to let the fluid flow out of the variable restriction 38 until an optimum condition in which the three LEDs 46a–46c emit light is reached.

In the above embodiment, the light-emitting assembly 48 is composed of the four LEDs 46a–46d, and the distance d is regarded as having reached within a predetermined allowable positioning range from the reference surface when the three LEDs 46a–46c emit light. However, the positioning detector 10 according to the present invention may employ a desired number of LEDs for displaying a desired number of emission patterns to indicate the distance d in more accurate steps. As shown in FIG. 5, a buzzer 76 or any of various other sources of audible sound may be connected to the collector of the transistor 60 for producing an audible warning when the LEDs 46a–46c are turned on, i.e., when the distance d has reached within a predetermined allowable positioning range.

As described above, even when the fluid pressure supplied from the fluid pressure source to the positioning detector varies, the positioning device can reliably detect whether the workpiece has been positioned in a desired position on the reference surface irrespective of the variation of the fluid pressure. The detected condition can be visually recognized easily by the user as it is displayed on the display assembly of LEDs. Adjustments may be made to balance the fluid pressure bridge using emission patterns displayed on the display assembly.

Although a certain preferred embodiment of the present invention has been shown and described in detail, it should be understood that various changes and modifications may be made therein without departing from the scope of the appended claims.

What is claimed is:

1. A positioning detector for detecting whether a workpiece is positioned on a reference surface, by detecting a back pressure of a nozzle from which a pressurized fluid is jetted toward the surface of said workpiece, said positioning detector comprising:

a positioning table having said reference surface and said nozzle with the tip thereof disposed on and perpendicular to said reference surface;

a first fluid passage communicating with said nozzle through a tube;

a second fluid passage communicating with atmospheric pressure via a variable restriction;

a third fluid passage, said third fluid passage having one end in communication with a fluid pressure source for supplying said pressurized fluid, said third fluid passage being disposed in a first casing having at least one fluid port connected with said fluid pressure source;

a pair of fixed restrictions for respectively supplying the pressurized fluid to said first and second fluid passages, said fixed restrictions being defined as respective orifices in a unitary restriction member, said unitary restriction member having a central fluid passage therein, wherein said orifices are disposed on diametrically opposite sides of said central fluid passage;

a semiconductor pressure sensor having an electrical bridge circuit for detecting a differential pressure between the pressures in said first and second fluid passages, wherein said electrical bridge circuit is driven by a fixed DC voltage power source;

a second casing coupled to said first casing, wherein said unitary restriction member, said variable restriction, and said pressure sensor are housed in said second casing, said unitary restriction member being positioned in said second casing such that an end of said central fluid passage is held in communication with another end of said third fluid passage;

a threshold generating circuit for generating a plurality of different threshold values, said threshold generating circuit comprising a plurality of resistors connected in series for dividing a fixed voltage of said fixed DC voltage power source, wherein said fixed DC voltage is simultaneously supplied to said bridge circuit and to said plurality of resistors;

comparing means for comparing said differential pressure with respective different threshold values, said comparing means comprising a plurality of comparators, wherein each of said comparators are respectively given the different threshold values as respective reference signals to be compared with said differential pressure, each of said threshold values corresponding to a different distance at which the workpiece has approached said reference surface;

each of said comparators comprising a pair of input terminals, one of said input terminals being supplied with an output signal from said electrical bridge circuit, and the other of said terminals being connected to a respective junction of the series-connected resistors;

a plurality of indicating means each connected respectively to output terminals of said comparators for indicating respective results of comparison by said comparing means, said comparators energizing said respective indicating means depending on the distance at which the workpiece has approached said reference surface.

2. A positioning detector according to claim 1, wherein said second casing includes respective parts of said first and second fluid passages, which communicate with respective pressure-detecting surfaces of said pressure sensor.

3. A positioning detector according to claim 1, wherein said variable restriction has an adjusting knob for regulating the rate at which the fluid flows therethrough, said adjusting knob projecting out of said second casing.

4. A positioning detector according to claim 1, wherein said indicating means comprises a plurality of light-emitting elements.

5. A positioning detector according to claim 4, wherein a circuit board having an electronic circuit for supplying electric signals to said indicating means is housed in said second casing closely to said first and second fluid passages.

6. A positioning detector according to claim 5, wherein said light-emitting elements are mounted on said second casing.

7. A positioning detector according to claim 6, wherein said light-emitting elements are mounted in a linear array on an outer surface of said second casing.

8. A positioning detector according to claim 7, wherein the number of said light-emitting elements is at least three.

9. A positioning detector according to claim 7, wherein the number of said light-emitting elements is four.

10. A positioning detector according to claim 1, further comprising notifying means for generating a notification signal when the workpiece reaches within a predetermined allowable range from the reference surface, said means connected to the output terminal of one of said comparators.

* * * * *